United States Patent
Sato et al.

(10) Patent No.: US 10,587,106 B1
(45) Date of Patent: Mar. 10, 2020

(54) WIRE HARNESS

(71) Applicant: Yazaki Corporation, Tokyo (JP)

(72) Inventors: Katsumi Sato, Shizuoka (JP); Naoto Kogure, Shizuoka (JP); Kosuke Tomosada, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/554,551

(22) Filed: Aug. 28, 2019

(30) Foreign Application Priority Data

Sep. 25, 2018 (JP) .................................. 2018-178503

(51) Int. Cl.
| | | |
|---|---|---|
| H02G 11/00 | (2006.01) | |
| B60R 16/02 | (2006.01) | |
| H01B 7/00 | (2006.01) | |

(52) U.S. Cl.
CPC ....... *H02G 11/006* (2013.01); *B60R 16/0207* (2013.01); *H01B 7/0045* (2013.01)

(58) Field of Classification Search
CPC ............ B60R 16/0215; B60R 16/0207; B60N 2/0224; B60N 2/06; H02G 3/04; H02G 3/40; H02G 3/0437; H02G 3/0462; H02G 3/0691; H02G 11/00; H02G 11/006; H02G 11/02; B60J 5/06; E05D 2015/1084; E05D 15/1081; H05K 5/0247; H01B 7/0853; H01B 7/0846; H01B 7/041; H01B 7/0045
See application file for complete search history.

(56) References Cited

U.S. PATENT DOCUMENTS

| | | | | |
|---|---|---|---|---|
| 2,975,807 | A * | 3/1961 | Waninger | F16G 13/16 138/108 |
| 5,016,842 | A * | 5/1991 | Suzuki | B60R 16/0215 248/68.1 |
| 6,161,894 | A * | 12/2000 | Chapman | B60J 5/06 296/155 |
| 6,340,199 | B1 * | 1/2002 | Fukumoto | B60J 5/06 296/155 |
| 2001/0052203 | A1 * | 12/2001 | Doshita | B60R 16/0215 49/502 |
| 2002/0129962 | A1 * | 9/2002 | Doshita | B60R 16/0215 174/72 A |

(Continued)

FOREIGN PATENT DOCUMENTS

JP    3919174 B2    5/2007

*Primary Examiner* — Roshn K Varghese
(74) *Attorney, Agent, or Firm* — Kenealy Vaidya LLP

(57) ABSTRACT

A wire harness includes a flexible conductor connecting a vehicle body with a movable body mounted on a vehicle and sliding relative to the vehicle body, a flexible limiting member extending along the conductor to limit the path of the conductor, a flexible outer member in which the conductor and the limiting member are inserted, and a holding member having a first trench for routing the conductor and a second trench adjacent to the first trench and holding an end of the limiting member. The holding member has a partition wall separating the first trench from the second trench, locking walls facing each other and locking an end of the outer member, and side walls defining the first trench. The locking walls project higher than the side walls, and the partition wall projects higher than the locking walls in a height direction of the side walls.

12 Claims, 13 Drawing Sheets

(56) References Cited

U.S. PATENT DOCUMENTS

| | | | | |
|---|---|---|---|---|
| 2008/0142260 A1* | 6/2008 | Yamaguchi | .......... | B60N 2/0224 |
| | | | | 174/72 A |
| 2016/0185308 A1* | 6/2016 | Sekino | ................. | H01B 7/1845 |
| | | | | 174/68.3 |
| 2016/0218496 A1* | 7/2016 | Terada | ................. | B60R 16/027 |

* cited by examiner

WIRE HARNESS

CROSS-REFERENCE TO RELATED APPLICATION(S)

The present application claims priority to and incorporates by reference the entire contents of Japanese Patent Application No. 2018-178503 filed in Japan on Sep. 25, 2018.

BACKGROUND OF THE INVENTION

1. Field of the Invention

The present invention relates to a wire harness.

2. Description of the Related Art

Wire harnesses including members such as biasing members are known. Japanese Patent No. 3919174 discloses a power supply device including a structure for preventing incorrect mounting of a harness biasing member. A flat spring of the harness biasing member has indentations at its base end, one being disposed at a first side, the other being disposed at a second side of the flat spring. One indentation is offset from the other indentation in the longitudinal direction. When the base end of the flat spring is inserted in a slit in a block of a protector base in the width direction of the flat spring, a raised portion in the slit is fitted in the indentation at the first side of the flat spring and a raised portion of a protector cover is fitted in the indentation at the second side of the flat spring.

When a wire harness includes a conductor, a limiting member for limiting the path of the conductor, and an outer member in which the conductor and the limiting member are inserted, it is desired that these three parts are more easily and efficiently mounted on a holding member such as a protector.

SUMMARY OF THE INVENTION

It is an object of the present invention to provide a wire harness that enables a worker to mount a conductor, a limiting member, and an outer member to a holding member efficiently.

In order to achieve the above mentioned object, a wire harness according to one aspect of the present invention includes a flexible conductor connecting a vehicle body of a vehicle with a movable body mounted on the vehicle and sliding relative to the vehicle body; a flexible limiting member extending along the conductor to limit a path of the conductor; a flexible outer member in which the conductor and the limiting member are inserted; and a holding member having a first trench in which the conductor is routed and a second trench disposed adjacent to the first trench and holding an end of the limiting member, wherein the holding member has a partition wall that separates the first trench from the second trench, a pair of locking walls that face each other and lock an end of the outer member, and side walls that define the first trench, and in a height direction of the side walls, the locking walls project to a higher position than the side walls and the partition wall projects to a higher position than the locking walls.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

The following describes a wire harness according to an embodiment of the present invention with reference to the accompanying drawings. The embodiment is not intended to limit the scope of the present invention. Components described in the embodiment below include components that can be easily thought of by a skilled person or components that are substantially the same.

Embodiment

Figure 1:
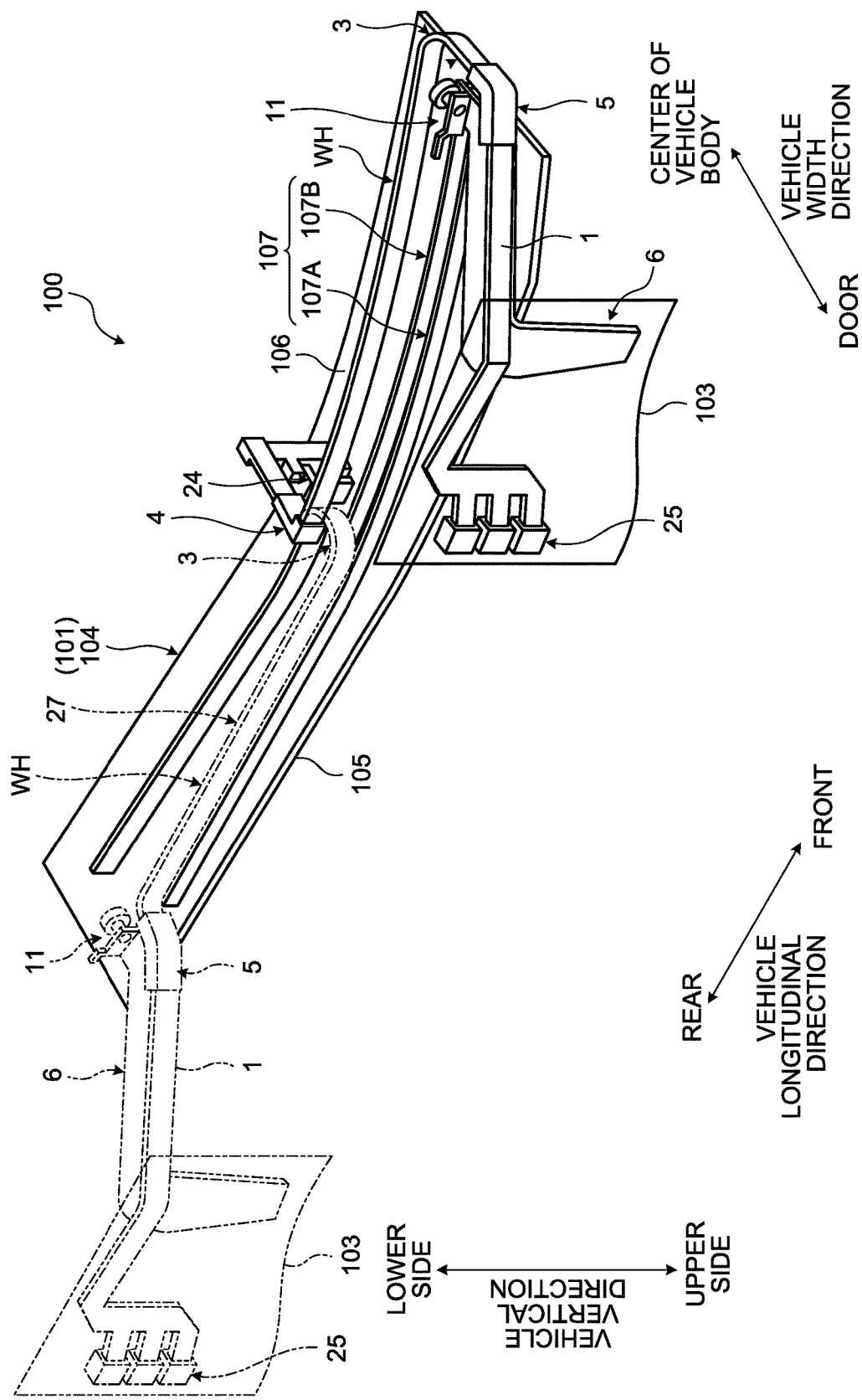
FIG. 1 is a perspective view of a wire harness according to an embodiment of the present invention.
Figure 2:
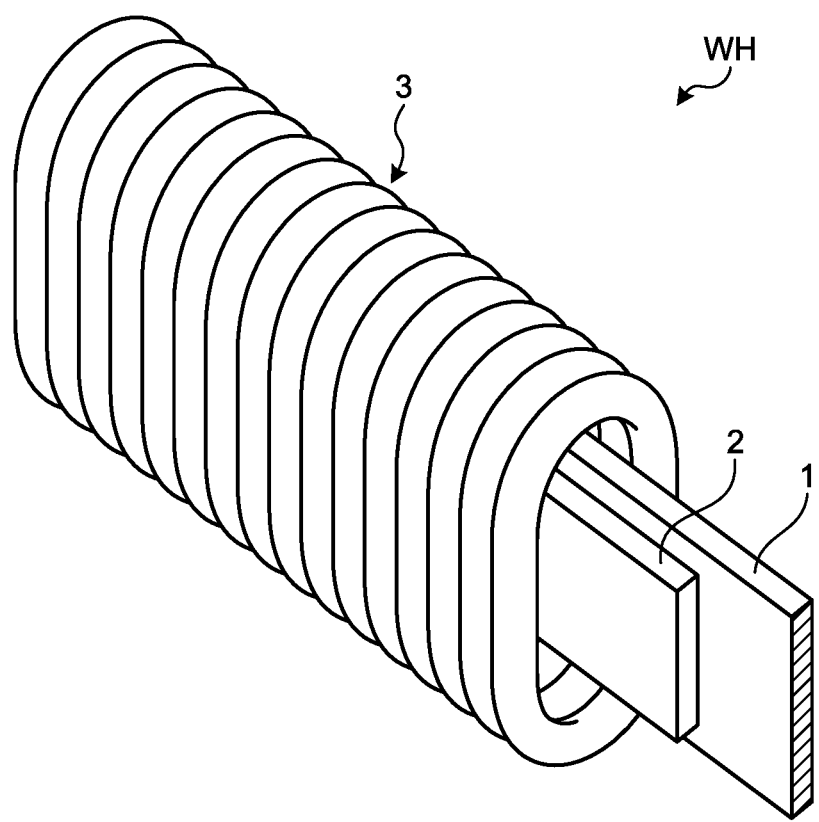
FIG. 2 is a perspective view of an outer member, a conductor, and a limiting member according to the embodiment.
Figure 3:
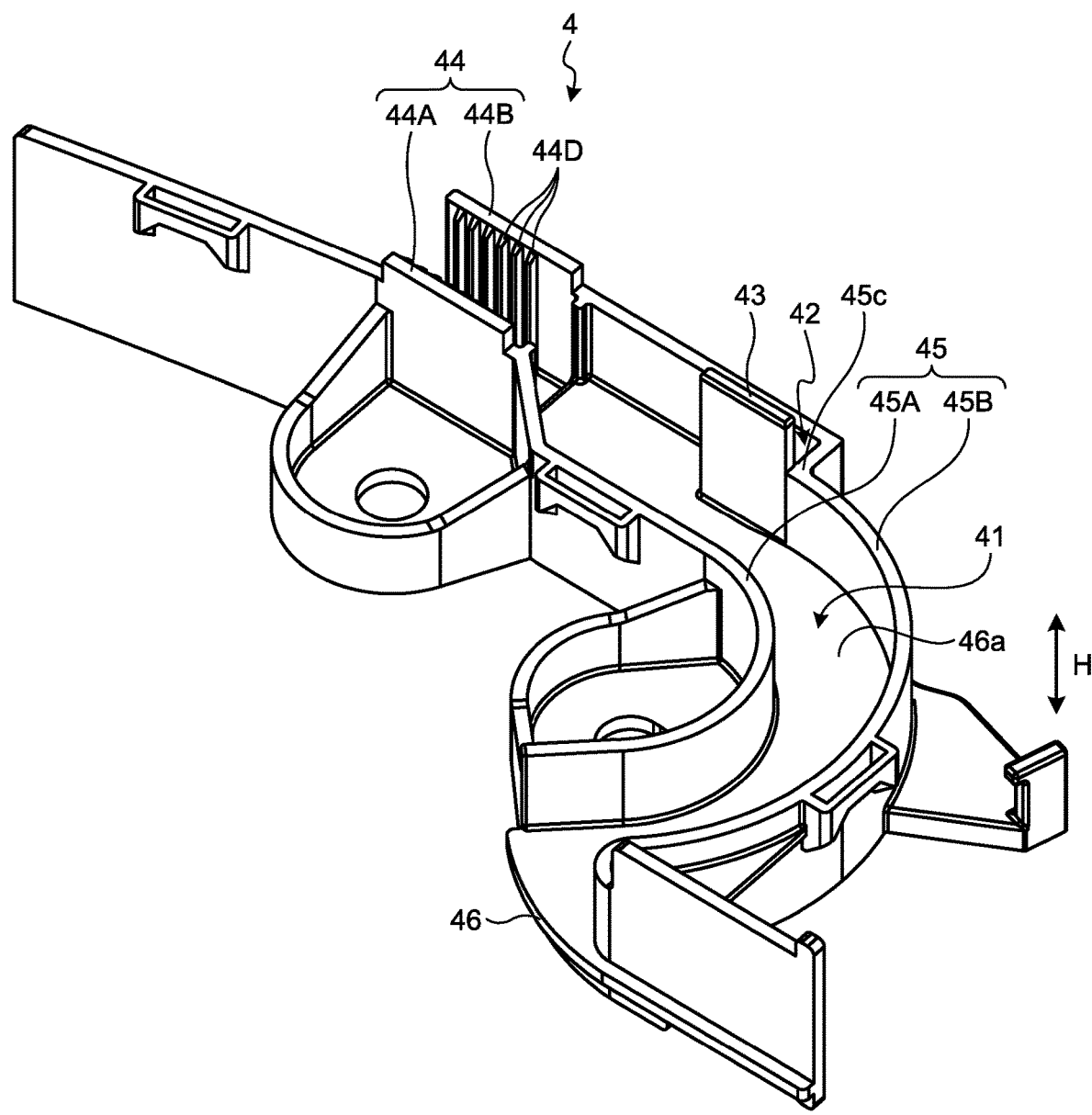
FIG. 3 is a perspective view of a first holding member according to the embodiment.
Figure 4:
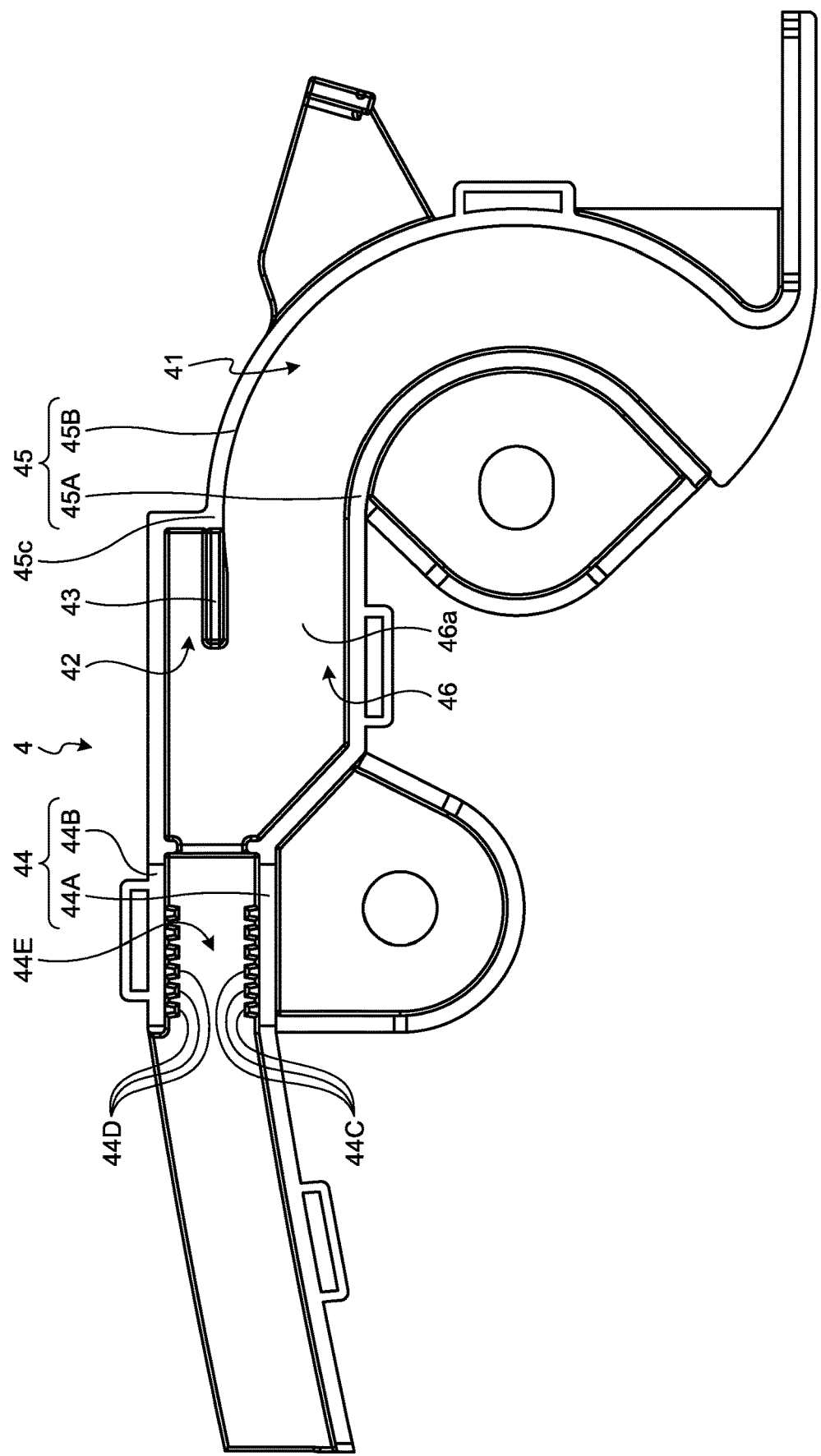
FIG. 4 is a plan view of the first holding member according to the embodiment.
Figure 5:
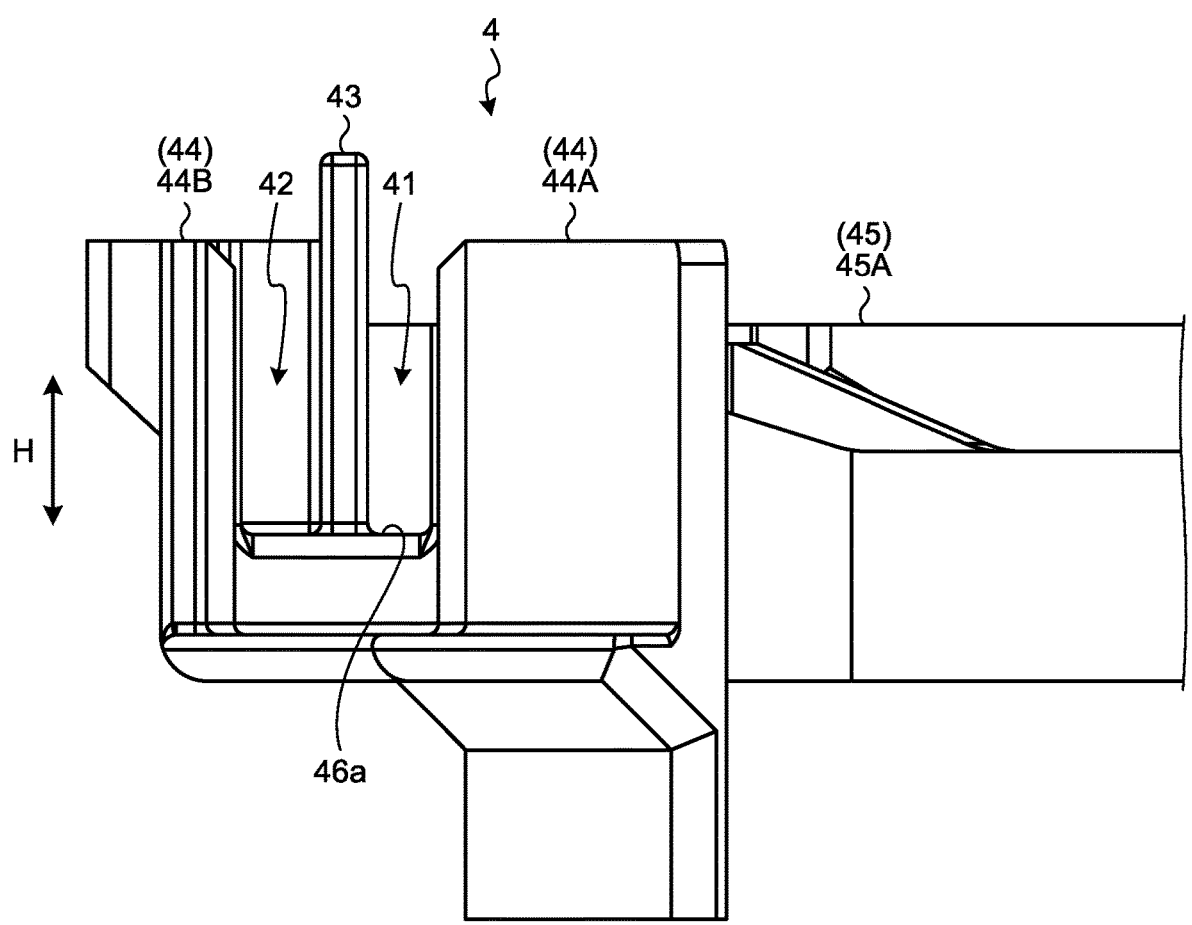
FIG. 5 is a front view of the first holding member according to the embodiment.
Figure 6:
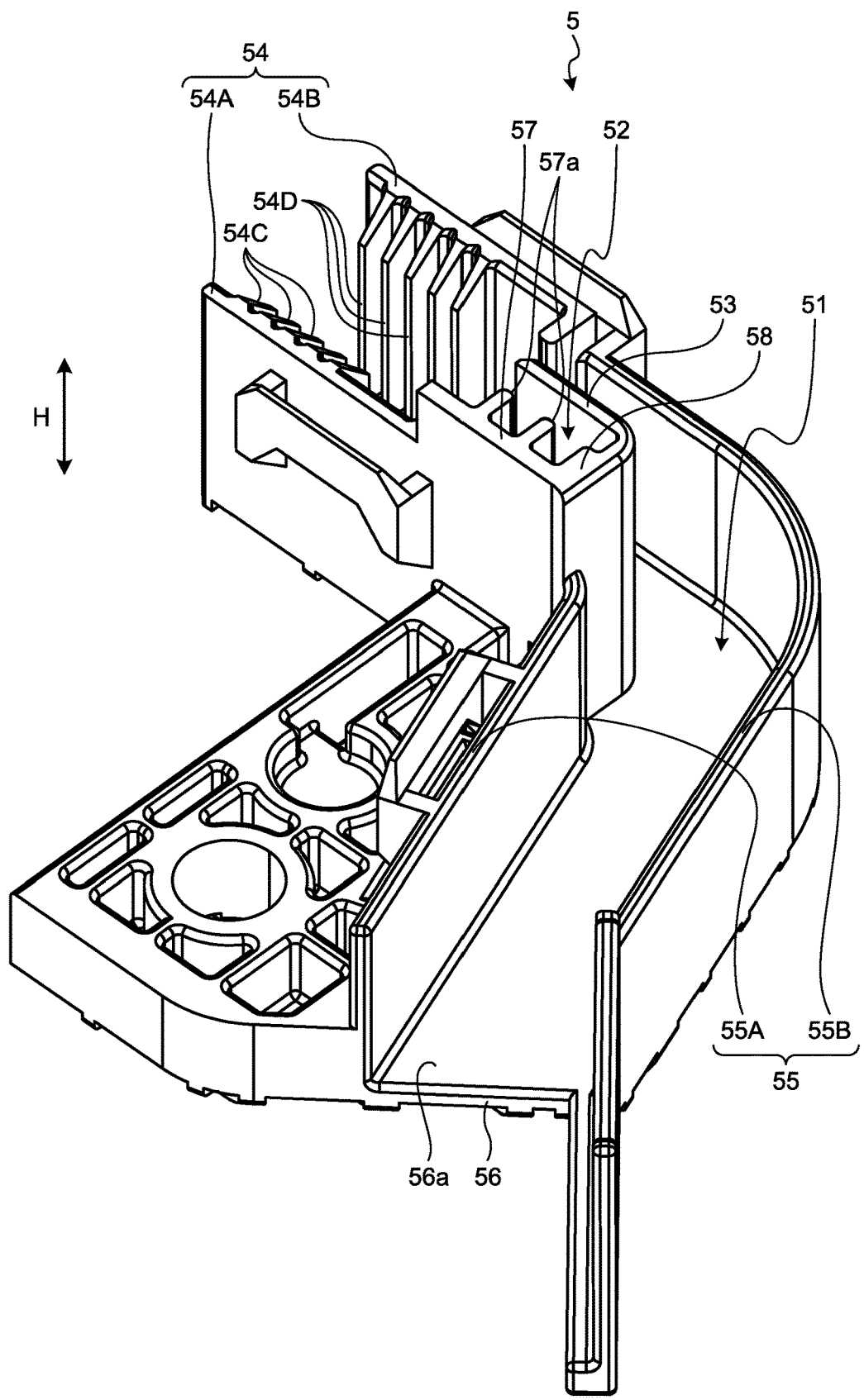
FIG. 6 is a perspective view of a second holding member according to the embodiment.
Figure 7:
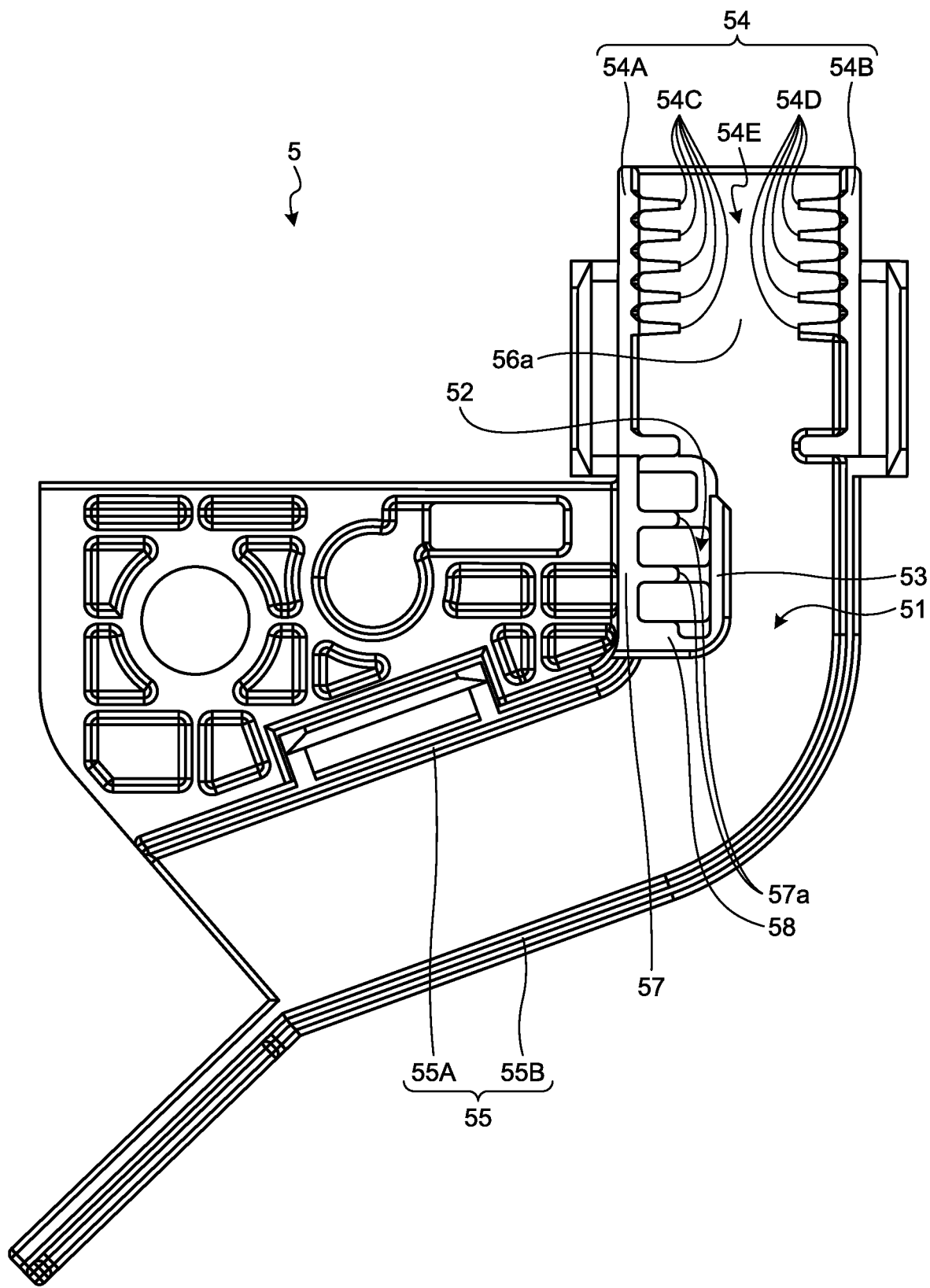
FIG. 7 is a plan view of the second holding member according to the embodiment.
Figure 8:
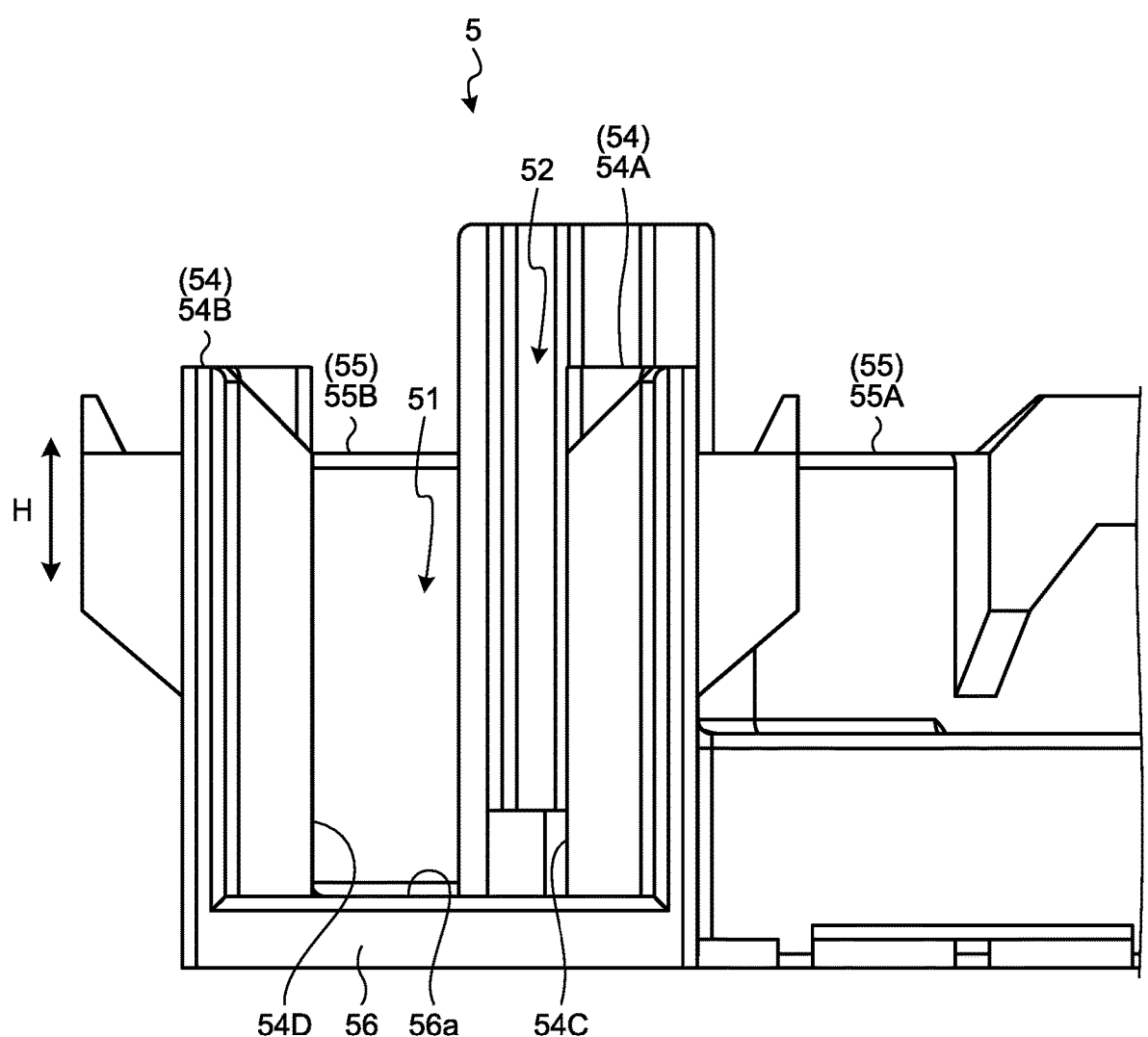
FIG. 8 is a front view of the second holding member according to the embodiment.
Figure 9:
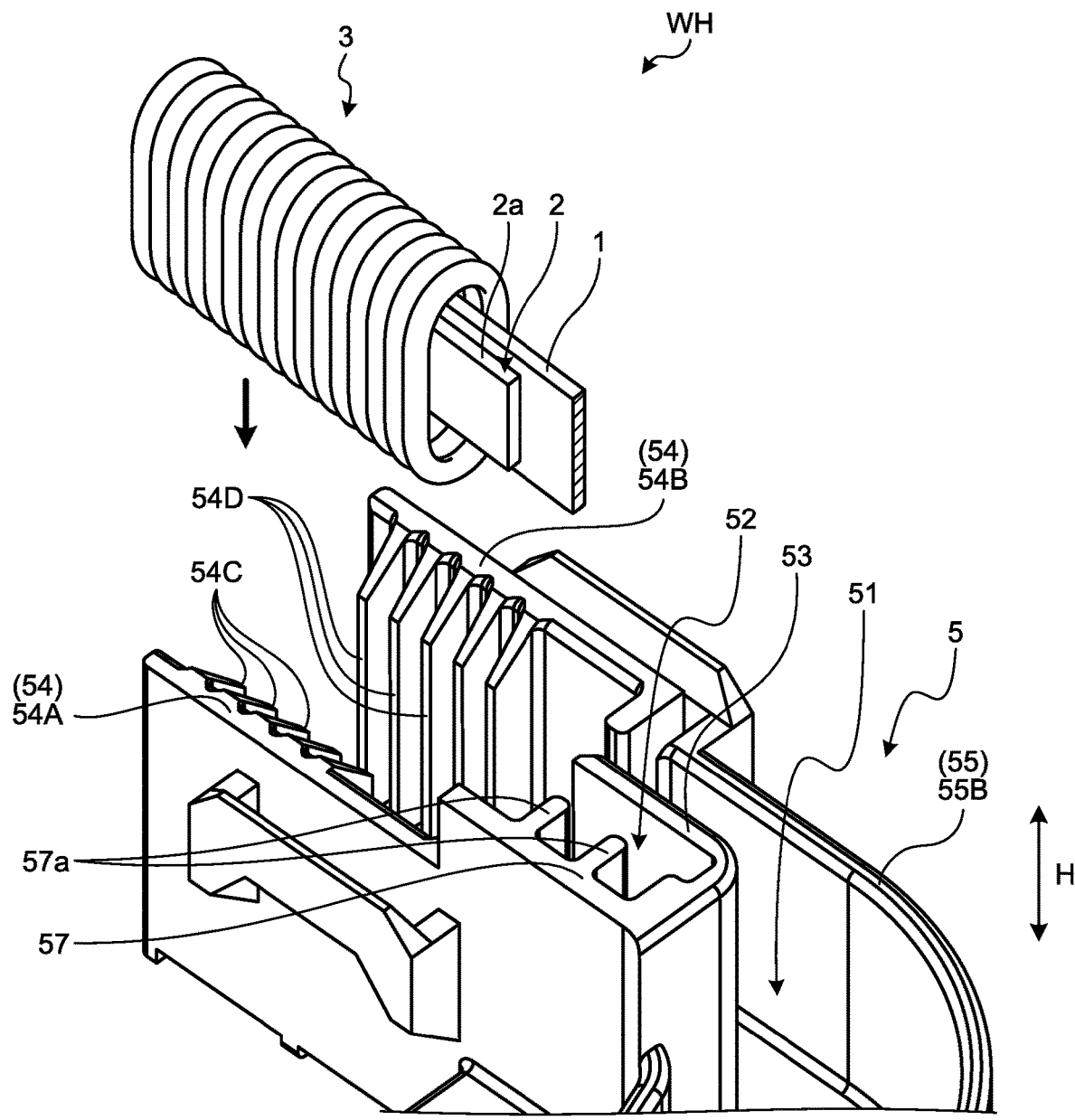
FIG. 9 is a perspective view illustrating a process of mounting the conductor, the limiting member, and the outer member to the second holding member.

An embodiment of the present invention will be described with reference to FIGS. 1 to 14. The present embodiment relates to a wire harness. FIG. 1 is a perspective view of the wire harness according to the embodiment. FIG. 2 is a perspective view of an outer member, a conductor, and a limiting member according to the embodiment. FIG. 3 is a perspective view of a first holding member according to the embodiment. FIG. 4 is a plan view of the first holding member according to the embodiment. FIG. 5 is a front view of the first holding member according to the embodiment. FIG. 6 is a perspective view of a second holding member according to the embodiment. FIG. 7 is a plan view of the second holding member according to the embodiment. FIG. 8 is a front view of the second holding member according to the embodiment. FIG. 9 is a perspective view illustrating a process of mounting the conductor, the limiting member, and the outer member to the second holding member.

Figure 10:
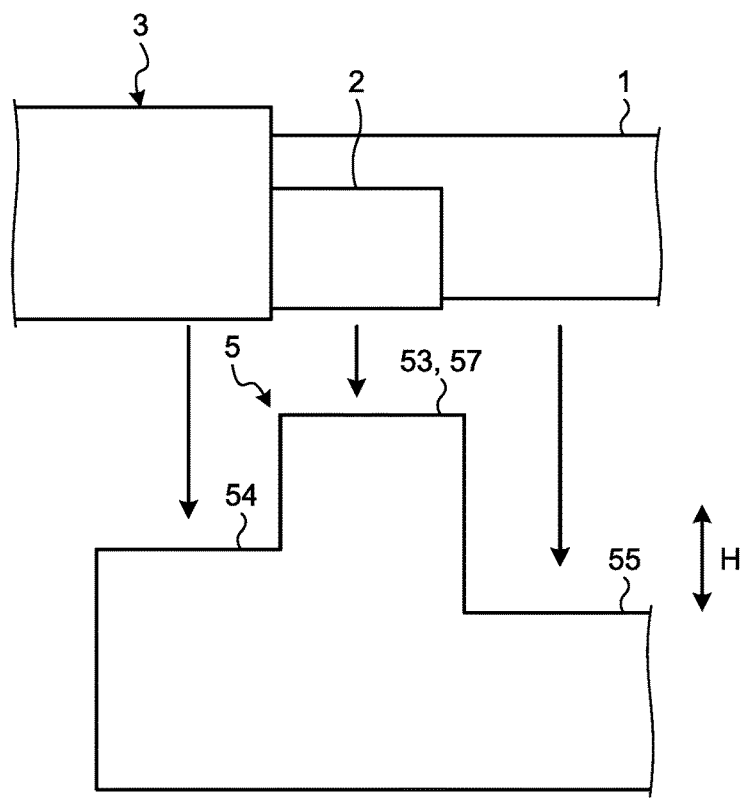
FIG. 10 is a side view at the start of the mounting process.
Figure 11:
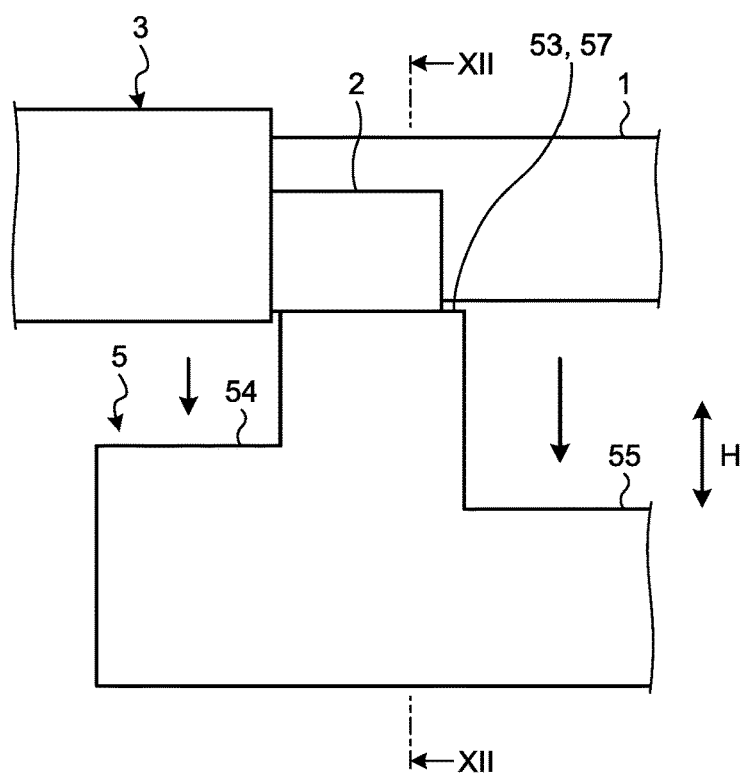
FIG. 11 is a side view illustrating a process of accommodating the limiting member in a second trench.
Figure 12:
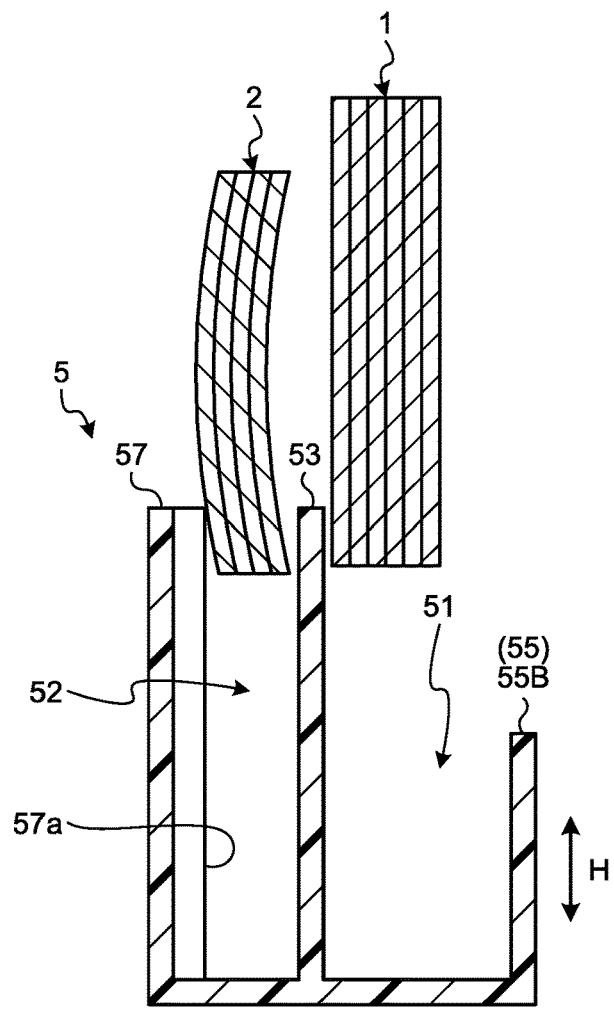
FIG. 12 is a cross-sectional view illustrating the process of accommodating the limiting member in the second trench.
Figure 13:
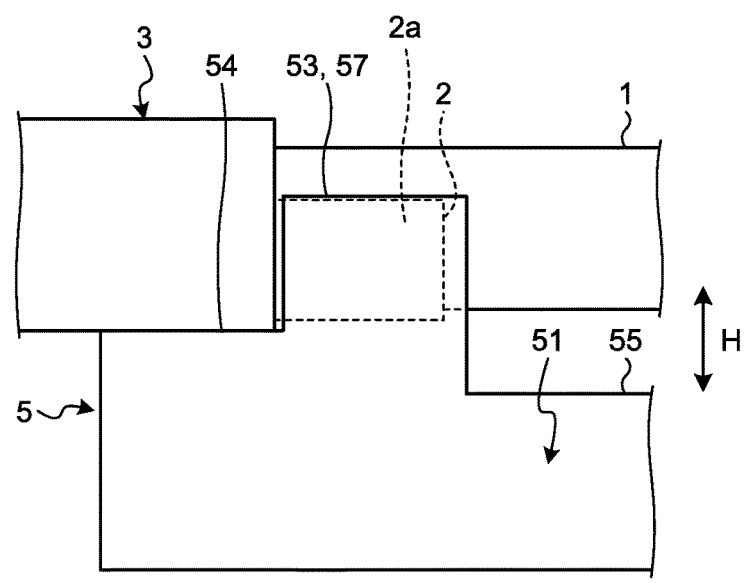
FIG. 13 is a side view illustrating a process of locking the outer member with locking walls.
Figure 14:
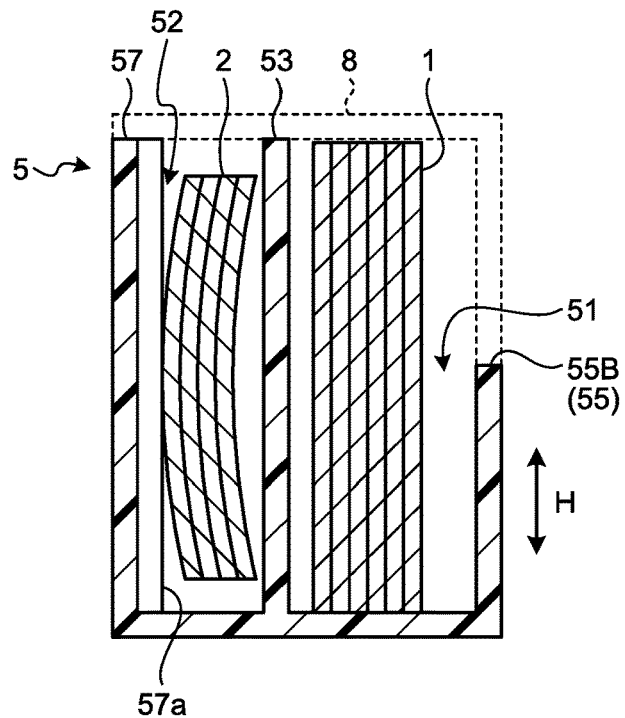
FIG. 14 is a cross-sectional view illustrating a state after the conductor is routed.

FIG. 10 is a side view at the start of the mounting process. FIG. 11 is a side view illustrating a process of accommodating the limiting member in a second trench. FIG. 12 is a cross-sectional view illustrating the process of accommodating the limiting member in the second trench. FIG. 13 is a side view illustrating a process of locking the outer member with locking walls. FIG. 14 is a cross-sectional view illustrating a state after the conductor is routed. FIG. 12 is a cross-sectional view taken along line XII-XII in FIG. 11.

As illustrated in FIGS. 1 and 2, a wire harness WH according to the embodiment includes a conductor 1, a limiting member 2, an outer member 3, a first holding member 4, a second holding member 5, a first connector 24, and a second connector 25. The wire harness WH is disposed on a step member 104 of a vehicle 100. The step member 104 is disposed at an opening of the vehicle 100. The opening is an opening of a vehicle body 101 and is opened and closed by a sliding door 103. The step member 104 is disposed at a lower side of the opening and is part of the vehicle body 101 of the vehicle 100. The step member 104 is made of, for example, synthetic resin. In FIG. 1, the wire harness WH, the second holding member 5, the sliding door 103, and a lower arm 6 illustrated in the solid line represent a completely closed state of the sliding door 103, and those illustrated in the long-dashed double-dotted line represent a fully opened state of the sliding door 103.

A surface of the step member 104 close to the upper side of the vehicle is referred to as a top surface 105 and a surface close to the lower side of the vehicle is referred to as a bottom surface 106. The wire harness WH is disposed on the bottom surface 106 of the step member 104. A guiding part 107 is provided on the bottom surface 106 of the step member 104. The guiding part 107 includes a pair of walls 107A and 107B that guide a sliding part 11 of the sliding door 103. The lower arm 6 is fastened to a lower part of the sliding door 103. The sliding part 11 is disposed at an end of the lower arm 6 close to the center of the vehicle body. The sliding door 103 slides in the longitudinal direction of the vehicle relative to the vehicle body 101 while being guided by, for example, the guiding part 107.

The wire harness WH electrically connects the vehicle body 101 with the sliding door 103 in the vehicle 100. The first connector 24 is disposed at an end of the wire harness WH close to the vehicle body 101. The first connector 24 is connected to a power source such as a battery and a controller installed in the vehicle body 101. The second connector 25 is disposed at the other end of the wire harness WH close to the sliding door 103. The second connector 25 is electrically connected to devices included in the sliding door 103.

As illustrated in FIG. 2, the conductor 1 and the limiting member 2 are inserted in the outer member 3. The conductor 1 and the limiting member 2 are put together and inserted in the outer member 3. Opposite ends of the conductor 1 and the limiting member 2 project from the outer member 3. The outer member 3 according to the embodiment is a corrugated tube. The outer member 3 can bend at any position.

The conductor 1 is a flexible conductor. The conductor 1 according to the embodiment has a plate-like shape or a ribbon-like shape. The wire harness WH according to the embodiment includes a flexible flat cable (FFC) as the conductor 1. The conductor 1 includes a plurality of core wires arranged in a row and a sheath that integrally covers the core wires. The core wires serve as a power line for supplying power and a signal line.

The limiting member 2 is a flexible member extending along the conductor 1 to limit the path of the conductor 1. The limiting member 2 has, for example, a higher flexural rigidity than that of the conductor 1. The limiting member 2 according to the embodiment is made of metal and has a plate-like shape. The limiting member 2 is, for example, a flat member having a rectangular cross-section, or a plate-like member having a generally arc cross-section. The limiting member 2 supports the conductor 1 such that, for example, the path of the conductor 1 does not deviate from a desired path.

The first holding member 4 is fastened to the vehicle body 101. The first holding member 4 is made of, for example, an insulating synthetic resin. As illustrated in FIGS. 3 to 5, the first holding member 4 has a first trench 41, a second trench 42, a partition wall 43, locking walls 44, side walls 45, and a bottom wall 46. When seen in the plan view, the first holding member 4 generally has a mirrored J-shape.

The first trench 41 serves as a routing path of the conductor 1. The first trench 41 is defined by the side walls 45 and the bottom wall 46. The side walls 45 project from a wall surface 46a of the bottom wall 46. The side walls 45 include a first side wall 45A and a second side wall 45B. The first side wall 45A and the second side wall 45B face each other. In other words, the routing space in which the conductor 1 is routed is defined by the first side wall 45A, the second side wall 45B, and the bottom wall 46. The first trench 41 extends from an end of the first holding member 4 to the opposite end in the longitudinal direction.

The locking walls 44 are disposed in an extension of the side walls 45. The locking walls 44 include a first wall 44A and a second wall 44B. The first wall 44A is contiguous with the first side wall 45A. The second wall 44B is contiguous with the second side wall 45B. The first wall 44A and the second wall 44B face each other. A passage 44E is formed between the first wall 44A and the second wall 44B, in which the outer member 3 is inserted. The partition wall 43 is disposed in an extension of the passage 44E.

The first wall 44A has protrusions 44C and the second wall 44B has protrusions 44D. The locking walls 44 lock an end of the outer member 3 with the protrusions 44C and 44D. The protrusions 44C and 44D extend in a height direction H. The height direction H corresponds to the height direction of the side walls 45, the locking walls 44, and the partition wall 43, or in other words, the direction in which the walls 43, 44, and 45 project from the bottom wall 46.

The protrusions 44C are disposed to face the corresponding protrusions 44D. The protrusions 44C and 44D are fitted in recessed portions of the corrugated shape of the outer member 3 to lock the outer member 3. A plurality of protrusions 44C and 44D are disposed at regular intervals in a direction in which the conductor 1 is routed.

The second trench 42 accommodates an end of the limiting member 2 and holds the end of the limiting member 2. The second trench 42 is adjacent to the first trench 41. The partition wall 43 projects from the wall surface 46a of the bottom wall 46. The partition wall 43 is a rectangular flat wall. The partition wall 43 linearly extends along the routing path of the conductor 1. The partition wall 43 according to the embodiment is disposed on an extension of the second side wall 45B. The second side wall 45B has a bent portion 45c bending away from the first side wall 45A. The partition wall 43 is adjacent to the bent portion 45c. A section of the first trench 41 corresponding to the partition wall 43 is defined by the first side wall 45A, the bottom wall 46, and the partition wall 43. In other words, the partition wall 43 divides the space between the first side wall 45A and the second side wall 45B into the first trench 41 and the second trench 42.

The second trench 42 is defined by the partition wall 43, the second side wall 45B, and the bottom wall 46. The second trench 42 opens toward the locking walls 44. The second trench 42 opens in a direction in which the partition wall 43 projects. In other words, the second trench 42 opens toward a side opposite to the bottom wall 46 in the height direction H. The second trench 42 according to the embodiment is generally rectangular when seen in the plan view.

The second holding member 5 is fastened to the sliding door 103. The second holding member 5 is made of, for example, an insulating synthetic resin. As illustrated in FIGS. 6 to 8, the second holding member 5 has a first trench 51, a second trench 52, a partition wall 53, locking walls 54, side walls 55, and a bottom wall 56.

The first trench 51 serves as a routing path of the conductor 1. The first trench 51 is defined by the side walls 55 and the bottom wall 56. The side walls 55 project from a wall surface 56a of the bottom wall 56. The side walls 55 include a first side wall 55A and a second side wall 55B. The first side wall 55A and the second side wall 55B face each other. In other words, the routing space in which the conductor 1 is routed is defined by the first side wall 55A, the second side wall 55B, and the bottom wall 56. The first trench 51 extends from an end of the second holding member 5 to the opposite end in the longitudinal direction.

The locking walls 54 are disposed in an extension of the side walls 55. The locking walls 54 include a first wall 54A and a second wall 54B. The first wall 54A is connected to the first side wall 55A via a facing wall 57 to be described later. The second wall 54B is contiguous with the second side wall 55B. The first wall 54A and the second wall 54B face each other. A passage 54E is formed between the first wall 54A and the second wall 54B, in which the outer member 3 is inserted. The partition wall 53 is disposed in an extension of the passage 54E.

The first wall 54A has protrusions 54C and the second wall 54B has protrusions 54D. The locking walls 54 lock the other end of the outer member 3 with the protrusions 54C and 54D. The protrusions 54C and 54D extend in the height direction H and face each other. The height direction H corresponds to directions in which the side walls 55, the locking walls 54, and the partition wall 53 project. The protrusions 54C and 54D are fitted in recessed portions of the corrugated shape of the outer member 3 to lock the outer member 3. A plurality of protrusions 54C and 54D are disposed at regular intervals in a direction in which the conductor 1 is routed.

The second trench 52 accommodates the other end of the limiting member 2 and holds the other end of the limiting member 2. The second trench 52 is adjacent to the first trench 51. The partition wall 53 projects from the wall surface 56a of the bottom wall 56. The partition wall 53 is a rectangular flat wall. The partition wall 53 linearly extends along the routing path of the conductor 1. In addition, the second holding member 5 has the facing wall 57 and an inner wall 58 as walls that define the second trench 52. The facing wall 57 faces the partition wall 53. The facing wall 57 connects the first side wall 55A with the first wall 54A. The facing wall 57 has a plurality of raised portions 57a projecting toward the partition wall 53. The raised portions 57a extend in the height direction H. The raised portions 57a and the partition wall 53 hold the limiting member 2 by sandwiching the limiting member 2 therebetween. As illustrated in FIG. 12, the limiting member 2 according to the embodiment is a plate-like member having a curved cross-section.

The limiting member 2 is elastically deformed and inserted in the space between the raised portions 57a and the partition wall 53.

The inner wall 58 connects the partition wall 53 with the facing wall 57. The partition wall 53, the facing wall 57, and the inner wall 58 constitute a unified wall having a u-shape when seen in the plan view. The inner wall 58 connects end portions of the partition wall 53 and the facing wall 57 away from the locking walls 54. The second trench 52 opens toward the locking walls 54. The second trench 52 opens in a direction in which the partition wall 53 projects. In other words, the second trench 52 opens toward a side opposite to the bottom wall 56 in the height direction H. The second trench 52 according to the embodiment is generally rectangular when seen in the plan view.

As illustrated in FIG. 5, the partition wall 43, the locking walls 44, and the side walls 45 of the first holding member 4 according to the embodiment have different heights. The locking walls 44 project to a higher position than the side walls 45 in the height direction H. The partition wall 43 projects to a higher position than the locking walls 44 in the height direction H.

As illustrated in FIG. 8, the partition wall 53, the locking walls 54, and the side walls 55 of the second holding member 5 according to the embodiment have different heights. The locking walls 54 project to a higher position than the side walls 55 in the height direction H. The partition wall 53 projects to a higher position than the locking walls 54 in the height direction H. This configuration facilitates the process of mounting the conductor 1, the limiting member 2, and the outer member 3 to the first holding member 4 and the second holding member 5, which will be described below.

With reference to FIGS. 9 to 14, a method of mounting the conductor 1, the limiting member 2, and the outer member 3 to the second holding member 5 will be described. As illustrated in FIG. 9, the conductor 1, the limiting member 2, and the outer member 3 are mounted on the second holding member 5 as they are moved in the height direction H. A worker holds the conductor 1, the limiting member 2, and the outer member 3 with the end of the outer member 3 facing the locking walls 54, the conductor 1 projecting from the outer member 3 facing the first trench 51, and a one end 2a of the limiting member facing the second trench 52.

The worker brings the conductor 1, the limiting member 2, and the outer member 3 closer to the second holding member 5 in the height direction H from a state illustrated in FIG. 9 to states illustrated in FIGS. 10 and 11. First, the worker inserts the one end 2a of the limiting member 2 into the second trench 52. As illustrated in FIG. 12, the worker inserts the top end of the partition wall 53 in the boundary between the conductor 1 and the limiting member 2. The locking walls 54 and the side walls 55 of the second holding member 5 according to the embodiment are disposed lower than the top end of the partition wall 53. As illustrated in FIG. 11, this configuration prevents the locking walls 54 from contacting the outer member 3 and the side walls 55 from contacting the conductor 1 when the limiting member 2 meets the top end of the partition wall 53. The worker, therefore, can easily insert the partition wall 53 in the boundary between the limiting member 2 and the conductor 1. In other words, the worker can easily insert the tip (the one end 2a) of the limiting member 2 in the second trench 52 and can separate the limiting member 2 from the conductor 1.

Subsequently, the worker pushes the conductor 1, the limiting member 2, and the outer member 3 further downward. This operation brings the outer member 3 into contact with the locking walls 54 as illustrated in FIG. 13. At this time, the side walls 55 are located lower than the conductor 1 and thus are not in contact with the conductor 1. The worker can, therefor, easily insert the end of the outer member 3 in the space between the first wall 54A and the second wall 54B.

Subsequently, the worker pushes the conductor 1, the limiting member 2, and the outer member 3 further downward to route the conductor 1 in the first trench 51. At this time, the tip (the one end 2*a*) of the limiting member 2 is held in the second trench 52 and the end of the outer member 3 is held by the locking walls 54. This configuration allows the worker to easily route the conductor 1 in the first trench 51. For example, when the first trench 51 has a curved shape, the worker can easily bend the conductor 1 in conformance to the curved shape of the first trench 51. After the processes above, the limiting member 2 is accommodated in the second trench 52 and the conductor 1 is routed in the first trench 51 as illustrated in FIG. 14. In the second holding member 5 according to the embodiment, the limiting member 2 is sandwiched between the raised portions 57*a* of the facing wall 57 and the partition wall 53. The limiting member 2 pushes the partition wall 53 and the raised portions 57*a* with its elastic restoring force.

Subsequently, a cover 8 is attached to the second holding member 5. The cover 8 is provided to cover the second holding member 5. The cover 8 covers the first trench 51 and the second trench 52 and the cover 8 and the second holding member 5 accommodate the conductor 1 and the limiting member 2. The cover 8 and the second holding member 5 hold the end of the outer member 3.

The structure of the wire harness WH according to the embodiment allows a worker to mount in order, the limiting member 2, the outer member 3, and the conductor 1 to the second holding member 5. First, the worker inserts the limiting member 2 in the second trench 52, and the worker has no need to hold the limiting member 2 anymore. This facilitates the assembling process of the wire harness WH. Then, the worker inserts the outer member 3 in the boundary between the first wall 54A and the second wall 54B, and the worker has no need to hold the outer member 3 anymore. This also facilitates the assembling process of the wire harness WH.

As a comparative example, suppose that the height levels of the partition wall 53, the locking walls 54, and the side walls 55 are the same. In this case, the worker needs to simultaneously carry out the operations of inserting the limiting member 2 in the second trench 52, inserting the outer member 3 in the space between the first wall 54A and the second wall 54B, and routing the conductor 1 in the first trench 51. This increases the work load of the worker, thereby reducing assembling efficiencies. The wire harness WH according to the present embodiment, however, enables the worker to mount the conductor 1, the limiting member 2, and the outer member 3 to the second holding member 5 with a lower work load, thereby increasing the assembling efficiencies.

The worker takes the same procedure to mount the conductor 1, the limiting member 2, and the outer member 3 to the first holding member 4. In this regard, the worker can mount the conductor 1, the limiting member 2, and the outer member 3 to the first holding member 4 efficiently. After mounting the conductor 1, the limiting member 2, and the outer member 3 to the first holding member 4, the worker attaches a cover to the first holding member 4.

As described above, the wire harness WH according to the embodiment includes the conductor 1, the limiting member 2, the outer member 3, and the holding members (first holding member 4, second holding member 5). The conductor 1 is a flexible conductor connecting the vehicle body 101 of the vehicle 100 with the sliding door 103 mounted on the vehicle 100 and slidable relative to the vehicle body 101. The sliding door 103 is an example of a movable body that is slidable relative to the vehicle body 101.

The limiting member 2 is a flexible member extending along the conductor 1 to limit the path of the conductor 1. The outer member 3 is a flexible member in which the conductor 1 and the limiting member 2 are inserted. The holding members have the first trenches 41, 51 in which the conductor 1 is routed and the second trenches 42, 52 disposed adjacent to the first trenches 41, 51, and hold the ends of the limiting member 2. The holding members have the partition walls 43, 53 that separate the first trenches 41, 51 from the second trenches 42, 52, a pair of locking walls 44, 54, and the side walls 45, 55. The locking walls 44 are a pair of walls facing each other and lock an end of the outer member 3. Also the locking walls 54 are a pair of walls facing each other and lock the other end of the outer member 3. The side walls 45, 55 define the first trenches 41, 51.

The locking walls 44, 54 project to a higher position than the side walls 45, 55 in the height direction H of the side walls 45, 55. The partition walls 43, 53 project to higher positions than the locking walls 44, 54. The structure of the wire harness WH according to the embodiment enables a worker to perform, in order, the accommodating process of accommodating the ends of the limiting member 2 in the second trenches 42, 52, the locking process of locking the ends of the outer member 3 with the locking walls 44, 54, and the routing process of routing the conductor 1 in the first trenches 41, 51 in an easier manner. Thus, the wire harness WH according to the embodiment can be assembled efficiently.

The partition walls 43, 53 according to the embodiment are flat walls extending along the routing path of the conductor 1. For example, the partition walls 43, 53 are formed to have shapes respectively extending in the directions in which the side walls 54, 55 extend. Since the partition walls 43, 53 are flat walls extending along the routing path of the conductor 1, the worker can easily insert each of the partition walls 43, 53 in the boundary between the conductor 1 and the limiting member 2 and can easily perform the accommodating process.

The partition walls 43, 53 according to the embodiment are disposed in the extensions of the passages 44E, 54E, the passages 44E, 54E being formed between the pair of locking walls 44, 54, respectively. This structure enables the worker to perform the accommodating process and the locking process with the conductor 1, the limiting member 2, and the outer member 3 being straight. The worker, therefore, can assemble the wire harness WH efficiently.

The second holding member 5 according to the embodiment has the facing wall 57 facing the partition wall 53 and defining the second trench 52. The facing wall 57 has the raised portions 57*a* projecting toward the partition wall 53. The limiting member 2 is sandwiched between the raised portions 57*a* and the partition wall 53. Sandwiching the limiting member 2 between the raised portions 57*a* and the partition wall 53 can stabilize the position of the limiting member 2.

Each of the second trenches 42, 52 according to the embodiment opens in two directions, one being a direction in which each of the partition walls 43, 53 projects, the other being a direction toward each of the locking walls 44, 54.

This structure enables the worker to easily insert the limiting member 2 in the second trenches 42, 52 along the partition walls 43, 53.

First Modification of Embodiment

Figure 15:
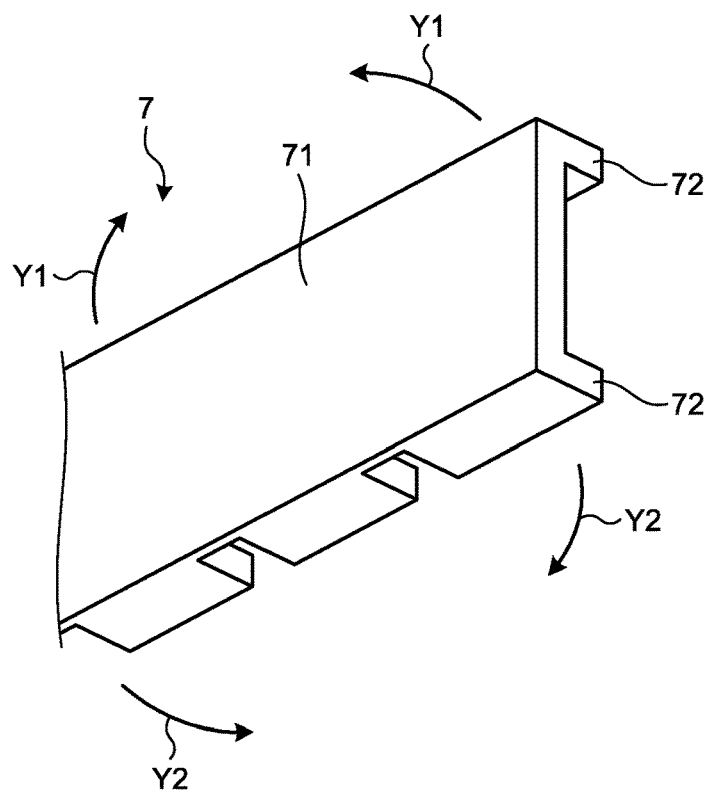
FIG. 15 is a perspective view of a limiting member according to a first modification of the embodiment.

A first modification of the embodiment will be described. FIG. 15 is a perspective view of a limiting member according to a first modification of the embodiment. This limiting member 7 according to the first modification may be used instead of the limiting member 2 according to the embodiment above.

The limiting member 7 according to the first modification is made of resin such as synthetic resin. The limiting member 7 has a flexible plate portion 71 and leg portions 72. The plate portion 71 is flexible. The leg portions 72 project from the plate portion 71 toward a side in the thickness direction. The leg portions 72 are disposed at the opposite sides of the plate portion 71 in the width direction and are spaced apart at the respective sides in the longitudinal direction of the plate portion 71. The leg portions 72 allow the plate portion 71 to bend toward one side (indicated by arrow Y1) in the thickness direction and restrict bending of the plate portion 71 toward the other side (indicated by arrow Y2) in the thickness direction. When the plate portion 71 is about to bend in the direction indicated by arrow Y2, the adjacent leg portions 72 abut each other and restrict the bending of the plate portion 71.

The material or shape of the limiting member is not limited to those of the limiting member 2 or 7 described above. The limiting member may be any member that limits the path of the conductor 1, and limiting members having various kinds of shapes such as a plate shape, a bar shape, and a tubular shape can be used. The shape of the second trenches 42, 52 is designed as appropriate in accordance with the shape or number of the limiting member to be used.

Second Modification of Embodiment

Figure 16:
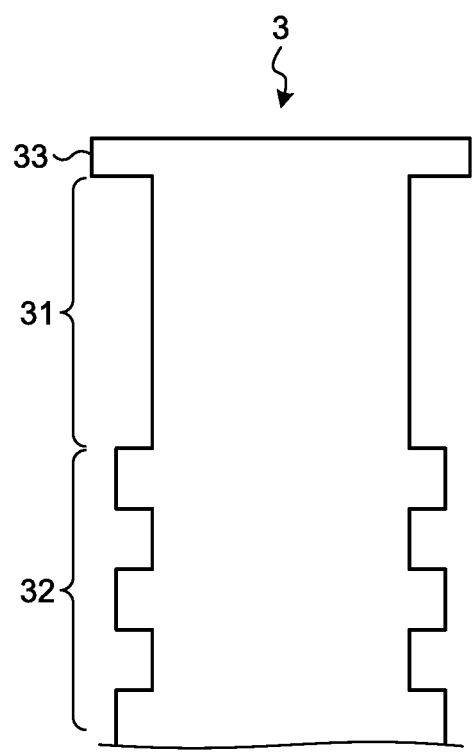
FIG. 16 is a plan view of an outer member according to a second modification of the embodiment.

A second modification of the embodiment will be described. FIG. 16 is a plan view of an outer member according to the second modification of the embodiment. The outer member 3 according to the second modification of the embodiment has a corrugated portion 32, a tubular portion 31, and a flange portion 33. The corrugated portion 32, the tubular portion 31, and the flange portion 33 are made of, for example, an insulating synthetic resin and are integrally formed.

The corrugated portion 32 has a corrugated shape and is flexible. The tubular portion 31 is connected to both ends of the corrugated portion 32. The tubular portion 31 has a cylindrical shape. The tubular portion 31 has a higher flexural rigidity than that of the corrugated portion 32. The flange portion 33 projects radially outward from periphery of the tubular portion 31. The flange portion 33 of the outer member 3 according to the second modification is locked by the locking walls 44, 54.

Combining the flexible corrugated portion 32 with the tubular portion 31 having a high flexural rigidity makes it easier to limit the path of the conductor 1. The tubular portion 31 each have a function of restricting bending of the conductor 1 and a function of limiting the extending direction of the conductor 1 to a certain direction. Since the outer member 3 limits the path of the conductor 1, the limiting member 2 can be, for example, lighter.

Third Modification of Embodiment

A third modification of the embodiment will be described. The conductor 1 is not limited to the FFC described above.

As the conductor 1, round cables, flat cables, or other types of cables may be used. The movable body slidable relative to the vehicle body 101 is not limited to the sliding door 103. The movable body may be, for example, a slidable seat. In other words, the wire harness WH may be used for connecting the slidable seat with the vehicle body 101.

The content disclosed in the embodiment and the first to the third modifications may be combined as appropriate to implement the present invention.

The wire harness according to the present embodiment includes a flexible conductor connecting a vehicle body of a vehicle with a movable body mounted on the vehicle and slidable relative to the vehicle body, a flexible limiting member extending along the conductor to limit a path of the conductor, a flexible outer member in which the conductor and the limiting member are inserted, and a holding member having a first trench in which the conductor is routed and a second trench disposed adjacent to the first trench and holding an end of the limiting member.

The holding member has a partition wall that separates the first trench from the second trench, a pair of locking walls that face each other and lock an end of the outer member, and side walls defining the first trench. The locking walls project to a higher position than the side walls and the partition wall projects to a higher position than the locking walls in a height direction of the side walls. The wire harness according to the present invention has the partition wall projecting to the highest position and the side walls projecting to the lowest position and this structure allows a worker to mount the conductor, the limiting member, and the outer member to the holding member efficiently.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wire harness comprising:
    a flexible conductor connecting a vehicle body of a vehicle with a movable body mounted on the vehicle and sliding relative to the vehicle body;
    a flexible limiting member extending along the conductor to limit a path of the conductor;
    a flexible outer member in which the conductor and the limiting member are inserted; and
    a holding member having a first trench in which the conductor is routed and a second trench disposed adjacent to the first trench and holding an end of the limiting member, wherein
    the holding member has a partition wall that separates the first trench from the second trench, a pair of locking walls that face each other and lock an end of the outer member, and side walls that define the first trench, and
    in a height direction of the side walls, the locking walls project to a higher position than the side walls and the partition wall projects to a higher position than the locking walls.

2. The wire harness according to claim 1, wherein the partition wall is a flat wall extending along a routing path of the conductor.

3. The wire harness according to claim 2, wherein the partition wall is disposed in an extension of a passage formed between the pair of locking walls.

4. The wire harness according to claim 3, wherein the holding member has a facing wall facing the partition wall and defining the second trench, and the facing wall has a raised portion projecting toward the partition wall, the limiting member being sandwiched between the raised portion and the partition wall.

5. The wire harness according to claim 4, wherein the second trench opens in two directions, one being a direction in which the partition wall projects, the other being a direction toward the locking walls.

6. The wire harness according to claim 3, wherein the second trench opens in two directions, one being a direction in which the partition wall projects, the other being a direction toward the locking walls.

7. The wire harness according to claim 2, wherein the holding member has a facing wall facing the partition wall and defining the second trench, and the facing wall has a raised portion projecting toward the partition wall, the limiting member being sandwiched between the raised portion and the partition wall.

8. The wire harness according to claim 7, wherein the second trench opens in two directions, one being a direction in which the partition wall projects, the other being a direction toward the locking walls.

9. The wire harness according to claim 2, wherein the second trench opens in two directions, one being a direction in which the partition wall projects, the other being a direction toward the locking walls.

10. The wire harness according to claim 1, wherein the holding member has a facing wall facing the partition wall and defining the second trench, and the facing wall has a raised portion projecting toward the partition wall, the limiting member being sandwiched between the raised portion and the partition wall.

11. The wire harness according to claim 10, wherein the second trench opens in two directions, one being a direction in which the partition wall projects, the other being a direction toward the locking walls.

12. The wire harness according to claim 1, wherein the second trench opens in two directions, one being a direction in which the partition wall projects, the other being a direction toward the locking walls.

\* \* \* \* \*